UNITED STATES PATENT OFFICE.

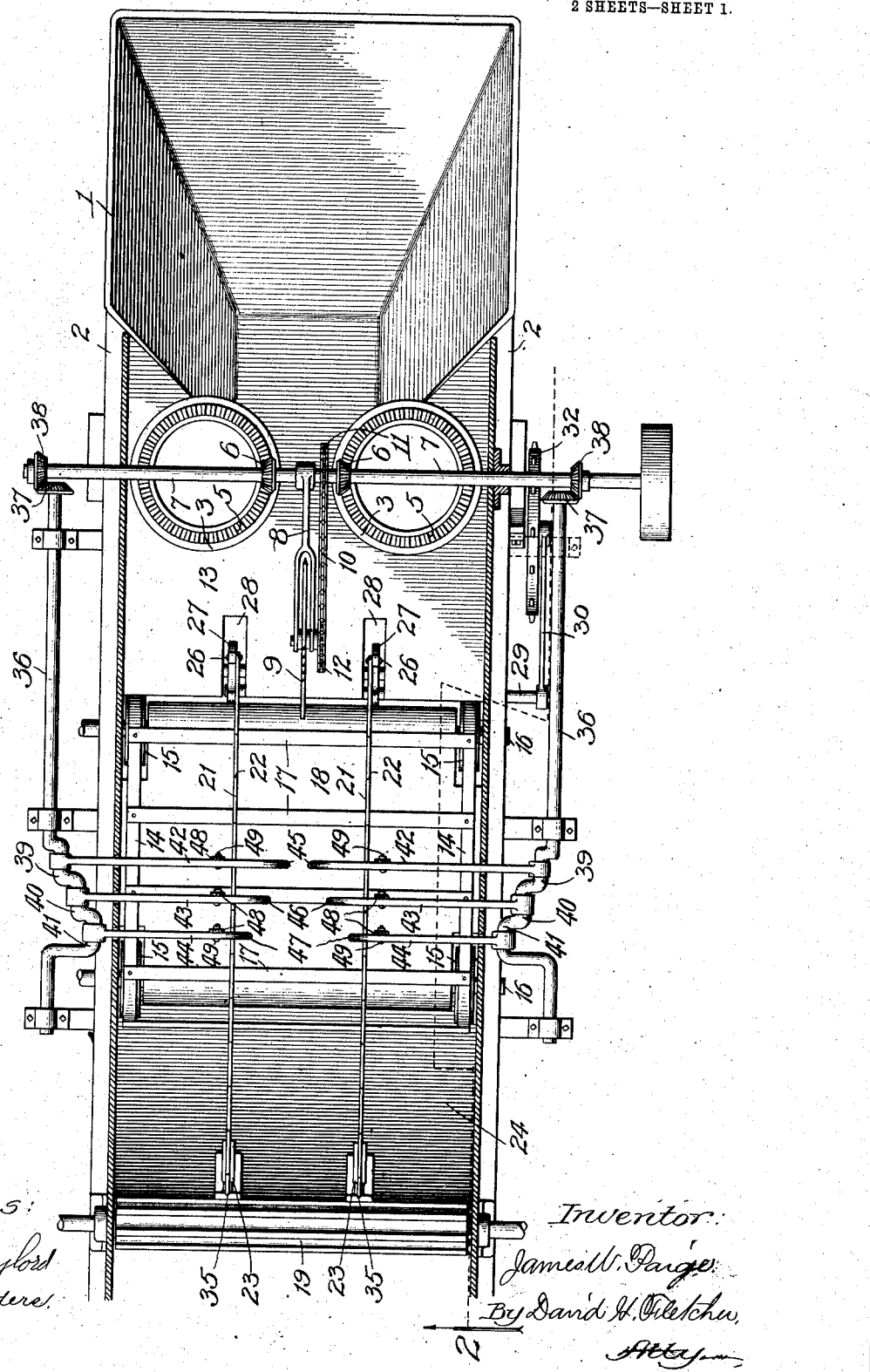

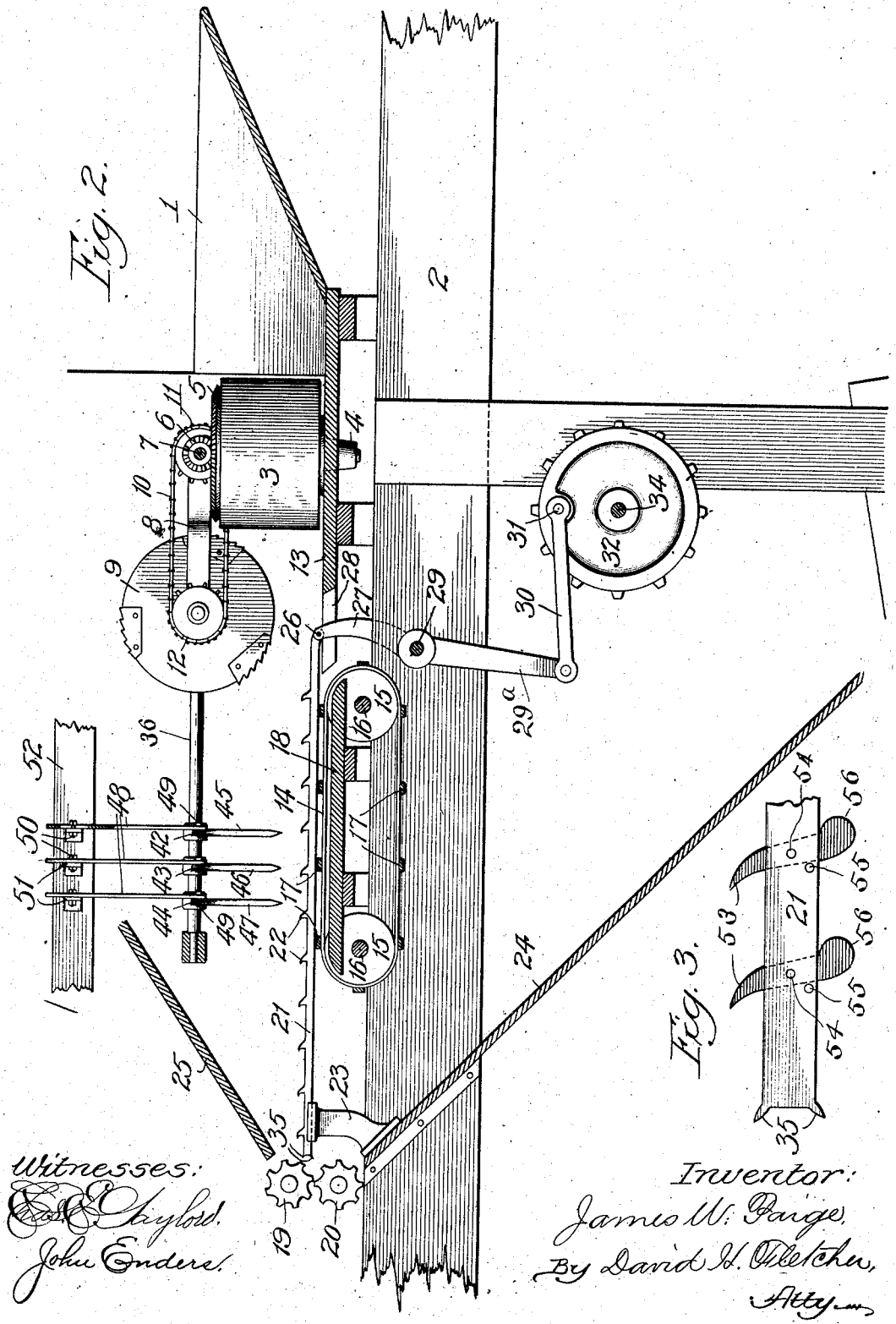

JAMES W. PAIGE, OF CHICAGO, ILLINOIS, ASSIGNOR, BY MESNE ASSIGNMENTS, TO GARLAND-VILA MANUFACTURING COMPANY, OF MUSKEGON, MICHIGAN, A CORPORATION OF MAINE.

FEEDING MECHANISM FOR CORN-HUSKING MACHINES.

No. 846,423.     Specification of Letters Patent.     Patented March 5, 1907.

Application filed February 15, 1906. Serial No. 301,231.

*To all whom it may concern:*

Be it known that I, JAMES W. PAIGE, a citizen of the United States, residing at Chicago, in the county of Cook and State of Illinois, have invented certain new and useful Improvements in Feeding Mechanism for Corn-Husking Machines, of which the following is a description, reference being had to the accompanying drawings, forming a part of this specification, in which corresponding reference-numerals in the different figures indicate like parts.

The object of my invention is to provide a self-feeding mechanism for corn-husking machines which shall be so constructed that when the bundles of corn are thrown upon the hopper they may be caused to move forward so that the band thereon may be cut and the stalks forming the bundle separated and gradually moved laterally until the distribution thereof upon the apron is uniform where the stalks approach the feed-rolls.

A further object is to prevent clogging by providing means whereby the disarranged stalks and leaves may be forced into positive contact with the feed-rolls, all of which is hereinafter more particularly described, and definitely pointed out in the claims.

In the drawings, Figure 1 is a plan view of a corn-husking machine embodying the features of my invention. Fig. 2 is a longitudinal vertical sectional view thereof, taken upon the line 2, Fig. 1, viewed in the direction of the arrow there shown; and Fig. 3 is a side view in detail of a modification of a forcing-bar, showing movable teeth.

Referring to the drawings, 1 represents a feed-hopper, which is mounted upon a suitable frame 2, which also supports the remaining portion of the machine. Located upon opposite sides of the hopper near the front end are feed-rollers 3 3, which are mounted upon vertical shafts supported in bearings 4, one of which is shown in Fig. 2. Said feed-rollers are provided with beveled gears 5 5, which mesh into beveled pinions 6 6 upon a transverse shaft 7, driven from any available source of power, thereby driving the rolls 3 to feed the stalks forward between said rolls. A bifurcated arm 8 is loosely mounted upon the shaft 7, and between the forks of said arm is located a rotary band-cutter 9, of any well-known form, which is actuated by means of a sprocket-chain 10, mounted upon sprocket-wheels 11 12, one upon the shaft 7 and the other upon the shaft of the saw.

In the same plane with the floor 13 of the hopper is located an apron of the usual well-known construction, consisting of belts 14 14, mounted upon pulleys 15, supported upon transverse shafts 16, one of which may be connected with a source of power. Slats 17 are attached to the belts and serve to convey the stalks forward above the usual floor 18 to the snapping-rolls 19 20. Located above the apron and arranged lengthwise of the machine is one or more, but preferably a plurality, of force-feeders consisting of bars 21, having forwardly and upwardly inclined teeth 22 thereon. The forward end of each of the bars 21 is loosely supported in a bracket 23, projecting upwardly from an inclined chute 24. An oppositely-inclined guide-board 25 above said brackets, Fig. 2, serves to direct the stalks to the feed-rolls. The rear ends of each of the forcing-bars 21 is jointedly connected at 26 with the upper end of an arm 27, which projects upwardly through a slot 28 in the floor 13. Each of said arms is keyed to a rock-shaft 29, to the outer end of which is keyed a depending arm 29ª, which in turn is connected by means of a pitman 30, Fig. 2, to a wrist-pin 31 upon a wheel 32, keyed to a shaft 34, adapted to be driven from any source of power, said depending arm, link, and pitman being shown in full lines.

The forward end of each of the forcing or pusher bars 21 is bifurcated or provided with prongs 35 to engage the stalks or obstructing portions and push them into engagement with the rolls.

In order to evenly distribute the stalks upon the apron before they reach the feed-rolls, I provide the following-described mechanism: Supported in suitable end bearings at the respective sides of the hopper between the rolls 3 and the feed or snapping-rolls are parallel crank-shafts 36 36, having beveled pinions 37 37 upon the ends, adapted to be driven by means of like pinions 38 38 upon the shaft 7. Cranks 39, 40, and 41, respectively, are formed upon each of the shafts 36, upon which are journaled, respectively, spreading-rakes 42 42, 43 43, and 44 44.

The rakes upon one crank-shaft are arranged to extend toward those upon the other, as shown in Fig. 1, and consist, preferably, of substantially straight arms having depending fingers 45 46 47 upon the free ends thereof. In order to prevent the fingers of said rakes from being brought into contact with the bars 21 or the apron-slats 16, I suspend the free ends of said rakes by means of links 48, which are jointedly connected to said bars at 49, and are also connected in like manner at 50 to rigid brackets 51, attached to a supporting-frame 52, extended lengthwise of the machine.

The rakes 42 are of such a length as to enable them to extend nearly or quite to the middle of the machine. The other pairs are made proportionately shorter, and the cranks to which they are attached are successively increased in length, so that the long rakes have a short stroke, the next a relatively longer one, and the last a maximum movement.

The operation of said device is as follows: The cornstalks being thrown upon the hopper in bundles, each successive bundle is pressed between the drums or rollers 3 and moved thereby beneath the rotary cutter 9, thus severing the band thereon and enabling the stalks to be separated. Being passed by the apron beneath the rakes, they are moved laterally in opposite directions and to a limited distance by the action of the rakes 42. The rakes 43 serve to move them still farther, and finally they are distributed to the full limit desired by the action of the rakes 45. In the meantime the serrated bars 21 aid in advancing them to the snapping-rolls, and should any stalks become crossed or any material intervene to cause clogging, they are forced into contact with said rolls by means of said forcing-bars.

In Fig. 3 I have shown a modified construction in connection with the feed-forcing bars 21. Instead of the rigid teeth 22 thereon I provide a series of forwardly-inclined teeth 53, which are pivotally mounted upon pins 54, attached to the bar. Said teeth are held in a normal position, as shown, against stops 55, by means of weights 56 upon their lower ends. This enables the points of the teeth to yield readily when the bars 21 are moved back, while causing them to assume and maintain normal positions during the advance of the bars.

Having thus described my invention, I claim—

1. A feeding mechanism for corn-husking machines, in which is combined means for advancing the stalks, a series of distributing-rakes arranged to move laterally in opposite directions from opposite sides of the machine and means for imparting an increasing length of stroke to said rakes in the order of their succession.

2. A feeding mechanism for corn-husking machines, in which is combined means for initially advancing a bundle in a central path upon the feeding-platform, a band-cutting device located in said path, a horizontal feeding-apron following said initial advancing means, a series of distributing-rakes located upon opposite sides of the feeding-platform and means for imparting a successively increasing movement to said rakes in the order of their arrangement upon the platform, whereby the distribution of the stalks may be accomplished gradually and completed by the time they arrive at the feed-rolls.

3. A feeding mechanism for corn-husking machines, in which is combined a feed-hopper, rollers or drums having vertical axes for initiating the forward movement of the stalks in a central position upon the hopper, an endless feeding-apron for receiving and advancing the stalks from said rollers, a plurality of rakes located upon opposite sides of said machine and cranks having varying lengths of stroke for actuating said rake.

4. In a machine of the class described, the combination with feed-rolls and a hopper, of means for advancing the stalks in the hopper, a series of rakes upon each side of the hopper, means for imparting an increasing length of stroke to said rakes in the order of their succession, serrated bars arranged lengthwise of the path of movement of the stalks and means for reciprocating said bars.

In testimony whereof I have signed this specification, in the presence of two subscribing witnesses, this 9th day of February, 1906.

JAMES W. PAIGE.

Witnesses:
D. H. FLETCHER,
C. E. JORDAN.